United States Patent [19]
Cebollero

[11] Patent Number: 5,865,558
[45] Date of Patent: Feb. 2, 1999

[54] BALL AND SOCKET JOINT BODY FOR CONTROL CABLE TERMINALS

[75] Inventor: Carlos Gabas Cebollero, Barcelona, Spain

[73] Assignee: FICO Cables, S.A., Barcelona, Spain

[21] Appl. No.: 849,914

[22] PCT Filed: Sep. 16, 1996

[86] PCT No.: PCT/ES96/00178

§ 371 Date: Jun. 3, 1997

§ 102(e) Date: Jun. 3, 1997

[87] PCT Pub. No.: WO97/13984

PCT Pub. Date: Apr. 17, 1997

[30] Foreign Application Priority Data

Oct. 10, 1995 [ES] Spain ................... P 9501953

[51] Int. Cl.⁶ ............................................. F16C 11/00
[52] U.S. Cl. .................. 403/133; 403/136; 403/141; 403/372
[58] Field of Search ................... 403/122, 129, 403/132, 133, 135, 136, 140, 141, 144, 326, 327, 328, 372; 384/206, 207, 208, 209, 210; 24/588, 700, 384

[56] References Cited

U.S. PATENT DOCUMENTS

| | | | |
|---|---|---|---|
| 3,115,375 | 12/1963 | Haller | 384/206 |
| 3,501,184 | 3/1970 | Van Winsen et al. | 403/133 |
| 4,679,958 | 7/1987 | Mizusawa et al. | 403/122 X |
| 4,765,674 | 8/1988 | Svensson | 384/206 X |
| 5,163,773 | 11/1992 | Denney et al. | 403/133 |
| 5,213,002 | 5/1993 | Langhof et al. | 403/133 X |
| 5,230,580 | 7/1993 | Henkel | 384/206 X |
| 5,360,274 | 11/1994 | Strobl | 384/206 X |
| 5,443,323 | 8/1995 | Prelat et al. | 403/135 X |
| 5,562,357 | 10/1996 | Sandell | 403/122 |
| 5,653,548 | 8/1997 | Amdahl | 403/122 X |

Primary Examiner—Daniel P. Stodola
Assistant Examiner—Bruce A. Lev
Attorney, Agent, or Firm—Michael J. Striker

[57] ABSTRACT

A ball and socket joint body for terminals of control cables has a transverse passage with respect to the coupling of the cable with the terminal which forms two reciprocally opposed inlet mouths of freely choosable alternative use, and a central chamber for housing a ball with elastically deformable retaining and seat structure. The retaining and seat structure can comprise a sleeve provided with perimetral projections, or a first shock-absorbing sleeve and a second sleeve provided with coplanar sectoral projections or two "U"-shaped springs or a sleeve and two "U" shaped springs which traverse it.

3 Claims, 2 Drawing Sheets

BALL AND SOCKET JOINT BODY FOR CONTROL CABLE TERMINALS

BACKGROUND OF THE INVENTION

The present invention relates to a ball and socket joint body for control cable terminals, which is generally applicable to control cables for the transmission of thrust-traction forces, which are usually known as push-pull operating cables. More particularly, the ball and socket joint body of the invention is applicable to terminals of thrust-traction control cables generally used as a means of linkage between the gearbox and its operating shift lever in automobile vehicles.

Widely known in the art are many embodiments of thrust-traction control cables which, basically consisting in a sheathed steel cable, are extensively used in the automobile industry as an articulated means of linkage between an actuating control and its associated mechanism. Such control cables are provided at one of their ends with a terminal which, when coupled to the corresponding actuating control, forms a ball articulation or ball and socket joint. Essentially, said articulation comprises a ball and socket body and a ball, in which the ball and socket body constituting the terminal is fixed to the corresponding end of the steel cable of the control cable by means of a rigid linking piece, such as an axially mounted metal rod, while the ball is fixed to the actuating control. The ball and socket body comprises a housing designed to receive the ball with a close fit and in such a way that once the ball and socket body and the ball are coupled together, the control cable is able to transmit thrust-traction forces along its axis for any of the actuating control positions habitually used.

In the known embodiments of ball and socket joint bodies such as those described above, the means for coupling of the ball and socket joint body with the ball consist, in summary, of a single opening made in the ball and socket joint body to permit the insertion by pressure of the ball into a spherical housing. In general, said coupling arrangement constitutes a clear disadvantage, in that coupling of the control cable with its corresponding actuating mechanism calls for prior positioning of the ball and socket joint body of the cable with respect to the ball. This disadvantage is accentuated in those cases in which the actuating control is formed by the gearbox gear shift lever; in this case, the positioning of the ball and socket joint body of the terminal of the control cable is generally only possible by rotating the control cable about itself, which given the usual scale of said control cables, together with the difficulty of access to the ball of the lever, constitutes an operation by no means devoid of difficulties and requiring in any case an execution time which increases fitting costs.

SUMMARY OF THE INVENTION

A ball and socket joint body of new structure and operation for terminals of control cables is made known hereby in order to provide a solution to the above-described disadvantages presented by the known embodiments of terminals for control cables, which when coupled form a ball or ball and socket joint.

The ball and socket joint body for terminals of control cables of the invention is applicable to terminals of thrust-traction control cables, of the type made up of a sheathed steel cable, in which the corresponding end of the steel cable has means for firm coupling thereof with the terminal which, preferably, is made by injection of plastic material and can adopt any configuration suitable to each specific case of application, said coupling means consisting in an axially mounted metal rod which is included in the terminal during manufacturing of same.

The ball and socket joint body for terminals of the invention is characterized in that it includes a passage arranged transversally with respect to the longitudinal axis of the means of coupling of the steel cable, in which the transverse passage has two reciprocally opposed inlet mouths, of freely choosable alternative use, situated on either side of the ball and socket joint body, and arranged in centred position a chamber of generally cylindrical shape for housing the ball linked to the actuating control and in which are provided elastically deformable retaining means and seat so designed that passage of the ball through one or other of the inlet mouths is implemented by double elastic deformation of the retaining and seat means.

According to a first embodiment, the retaining and seat means are characterized in that they comprise, coaxially arranged with respect to the transverse passage and fixed to the ball and socket joint body, a sleeve which forms a central chamber and which has at both its ends a respective internal perimetral retaining projection and seat.

According to the above mode of embodiment of the retaining means and seat, the internal perimetral projections are characterized in that they have a cross section of general interior-oriented sawtooth outline, so that entry of the ball into the central chamber is implemented by the application of a force in the direction given by the longitudinal axis of the chamber to produce elastic deformation of the corresponding projection, that force being lower in intensity than the contrary force which has to be applied, once the ball is situated in the central chamber, to produce elastic deformation of the corresponding projection and withdraw the ball from the chamber.

According to a second mode of embodiment, the retaining and seat means are characterized in that they include, coaxially arranged with respect to the transverse passage and fixed to the ball and socket joint body, two superimposed sleeves, a first and second sleeve respectively, in which the first sleeve acts as a shock absorber and the second sleeve forms the central chamber and at both its ends a respective plurality of coplanar sectoral retaining and seat projections, preferably three in number, situated with those on one side alternating in position with those on the other.

According to the above mode of embodiment of the retaining and seat means, each coplanar sectoral projection is characterized in that it has a cross section of general interior-oriented sawtooth outline, so that entry of the ball into the central chamber is implemented by the application of a force in the direction given by the longitudinal axis of the chamber to produce elastic deformation of the corresponding coplanar sectoral projections, that force being lower in intensity than the contrary force which has to be applied, once the ball is situated in the central chamber, to produce elastic deformation of the corresponding coplanar sectoral projections and withdraw the ball from the chamber.

The above-described characteristics of the ball and socket joint body for terminals of control cables of the invention, provide an innovative solution to the disadvantages presented by the known embodiments of ball and socket joint body in which coupling with the ball of the articulation is implemented on one side only. Indeed, the fact that the ball and socket joint body of the invention includes a passage which is transverse with respect to the longitudinal axis of the means of coupling with the steel cable, forming two inlet mouths of freely choosable alternative use, greatly facilitates the operations of coupling with the ball of the articulation, since said coupling can be implemented through either of said inlet mouths to leave the ball firmly housed in a central chamber. Moreover, the characteristic retaining means and seat with which the central chamber of the ball and socket joint body is provided permit the intensity of the forces to be applied for coupling and uncoupling of the ball and socket joint body with and from the ball of the articulation to be equal or different in function of the needs arising in each specific case of application; that is, one of the options, the one which the first and second modes of embodiment of the retaining means and seat render possible, consists in the intensities of the coupling and uncoupling forces being different, and specifically the intensity of the uncoupling force is substantially greater than that of the coupling force, this arrangement having the purpose, firstly, of facilitating entry of the ball of the articulation into the central chamber of the ball and socket joint body and, secondly, ensuring that under normal working conditions the ball of the articulation cannot come out of the central chamber, while another of the options, that which the third and fourth embodiments of the retaining means and seat render possible, consists in the intensity of the coupling force being equal to that of the uncoupling force, said force being of an intensity such that, when the ball is situated in the central chamber and under normal working conditions, it prevents the ball being able to come out of the central chamber.

BRIEF DESCRIPTION OF THE DRAWINGS

The drawing sheets of the present specification show the ball and socket joint body for terminals of control cables of the invention. In said drawings.

DESCRIPTION OF A PREFERRED EMBODIMENT

Figure 1:
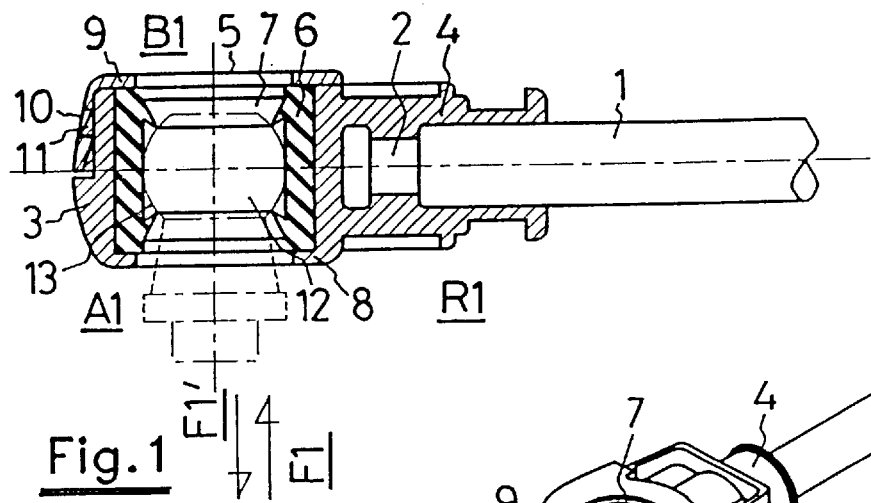
FIG. 1 is a longitudinal section view of a first mode of embodiment R1 of the ball and socket joint body of the invention.
Figure 2:
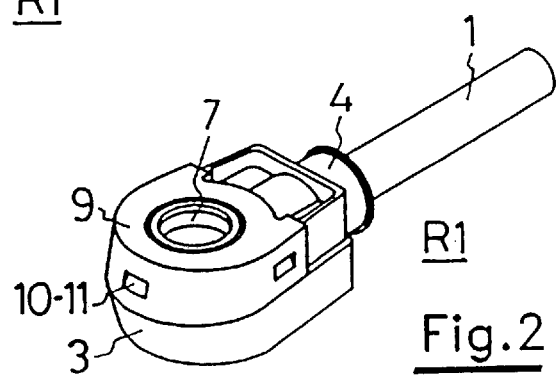
FIG. 2 is a perspective view of the mode of embodiment R1 shown in FIG. 1.

The figures of the drawing sheets show four modes of embodiment, indicated as R1, R2, R3 and R4, of the ball and socket joint body for terminals of control cables of the invention; FIGS. 1 and 2 show the first mode R1, FIGS. 3 and 4 the second mode R2, FIGS. 5 to 8 the third mode R3, and FIGS. 9 to 12 the fourth mode R4. All the modes of embodiment R1, R2, R3 and R4 are applicable to a control cable, made up essentially of a sheathed steel cable, of which, for the purposes of greater clarity of outline, only a metal rod 1 has been shown, which, fixed to the corresponding end of the steel cable, forms at its free end a coupling extension 2 shown in FIGS. 1, 3, 5 and 9.

The modes of embodiment R1 and R2 use a same general configuration of the ball and socket joint body, marked with reference number 3, while the modes of embodiment R3 and R4 use in their turn also a same general configuration of the ball and socket joint body which is different from the previous embodiment and is marked with reference number 19; it is understood that, as stated above, the ball and socket joint body can adopt any configuration suited to each specific case of application without the essential nature of the invention being affected thereby, and that the ball and socket joint bodies 3, 19 shown in the figures of the drawing sheets are given solely by way of illustrative example. In the description which follows of the modes of embodiment R1 and R2, the parts common to both embodiments share the same reference numbers, and the same criterion is applied in description of the modes of embodiment R3 and R4.

The modes of embodiment R1, R2, R3 and R4 of the ball and socket joint body of the invention are designed to be coupled to a ball 13, shown by means of broken lines in FIGS. 1, 3, 7 and 10 of the drawing sheets, attached to an actuating control which, for the same reasons as indicated above, is not shown.

FIGS. 1 and 2 show how the mode of embodiment R1 comprises a ball and socket joint body 3 of essentially elongated parallelepiped shape in which, longitudinally, an extension 4 can be observed on which during manufacturing of the ball and socket joint body 3 the coupling extension 2 of the rod 1 is included. FIG. 1 shows how, transversally arranged with respect to the longitudinal axis of the rod 1, the ball and socket joint body 3 has a passage 5 which forms two equal inlet mouths A1 and B1, respectively. Coaxially arranged with respect to the transverse passage 5 there is a sleeve 6 of elastic material and of hollow general cylindrical shape on both ends of which, which ends are open, there is a respective internal perimetral retaining projection 7 and seat symmetrically situated with respect to the main theoretical transverse plane of the transverse passage 5. For securing of the sleeve 6, the ball and socket joint body 3 has, at one of the ends of the transverse passage 5, the end corresponding to inlet mouth A1, an annular projection 8 which works by way of seat and on which there rests the sleeve 6, while at its other end, the end corresponding to inlet mouth B1, there is a detachable cover 9 which can be coupled to the ball and socket joint body (3) by means of respective and complementary securing openings 10 and projections 11.

FIG. 1 shows how the sleeve 6 forms a central chamber 12 which, delimited by the two internal perimetral projections 7 for retaining and seating, is designed to receive the ball 13 with a close fit. In FIG. 1, the ball 13 is inserted into the central chamber 12 by traversing mouth A1; it can be understood that given the symmetry of the transverse passage 5, the ball 13 could be inserted into the central chamber 12 either through inlet mouth A1 or inlet mouth B1.

The internal perimetral projections 7 for retaining and seating have a cross section of sawtooth outline oriented inwards, as shown in FIG. 1. With this configuration of the projections 7, entry of the ball 13 into the central chamber 12, for example through mouth A1 as shown in FIG. 1, requires the application of a force F1 in the direction given by the longitudinal axis of the central chamber 12 of an intensity sufficient to overcome the elastic reaction of the corresponding perimetral projection 7, with the force F1 being lower in intensity than the contrary force F1' which has to be applied so that, once the ball 13 is situated in the chamber 12, it can then be withdrawn.

Figure 3:
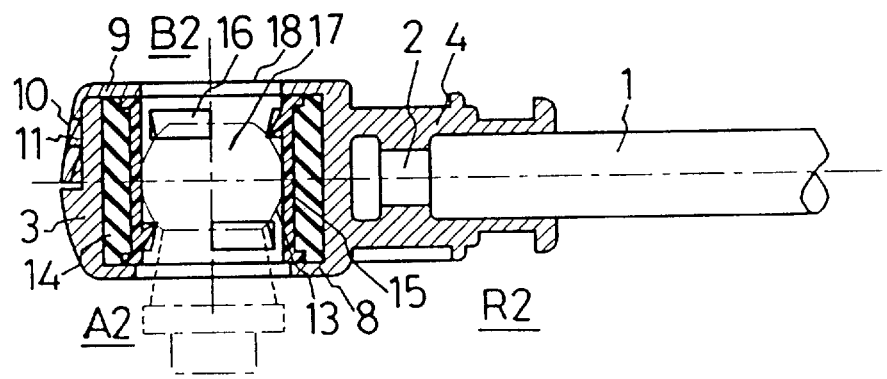
FIG. 3 is a longitudinal section view of a second mode of embodiment R2 of the ball and socket joint body of the invention.
Figure 4:
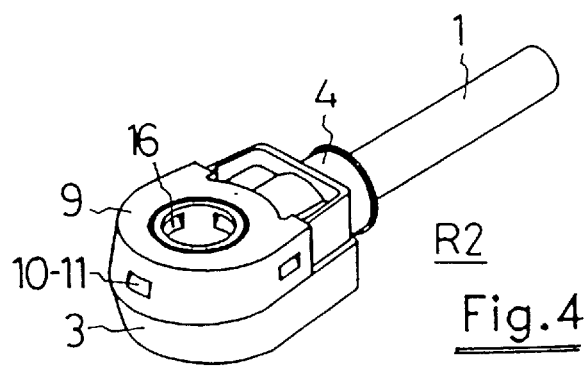
FIG. 4 is a perspective view of the mode of embodiment R2 shown in FIG. 3.
Figure 5:
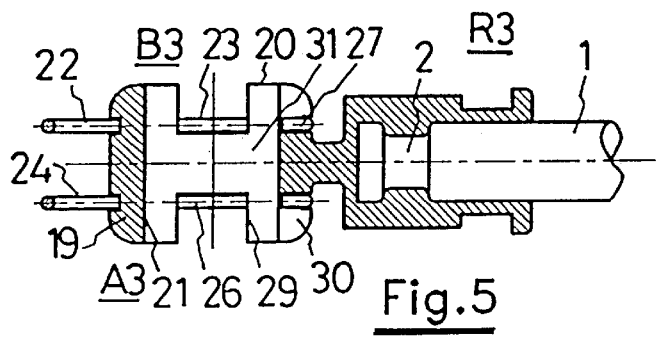
FIG. 5 is a longitudinal section view of a third mode of embodiment R of the ball and socket joint body of the invention.
Figure 7:
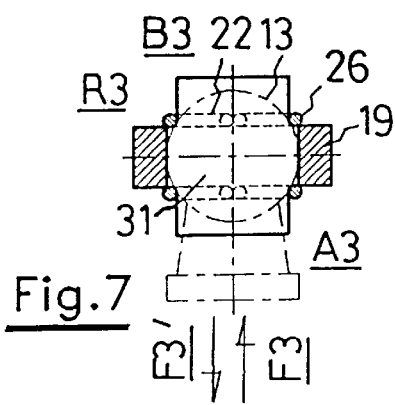
FIG. 7 is a cross-section view of the mode of embodiment R3 shown in FIGS. 5 and 6.
Figure 6:
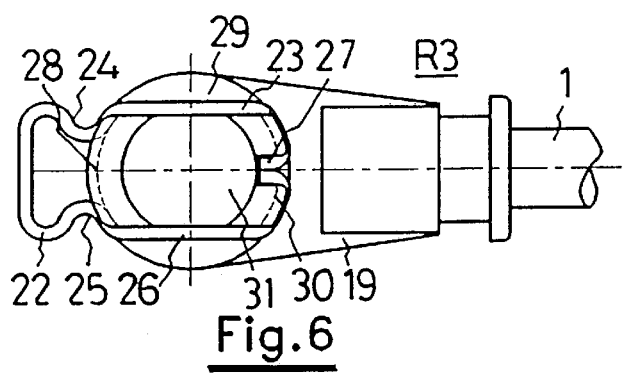
FIG. 6 is a plan view of the mode of embodiment R3 shown in FIG. 5.
Figure 8:
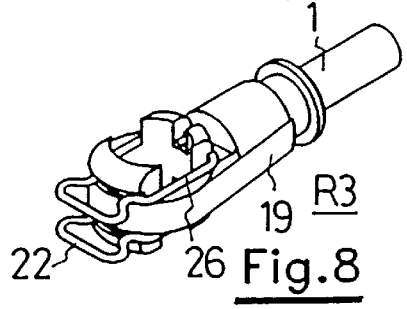
FIG. 8 is a perspective view of the mode of embodiment R3 of the ball and socket joint body of the invention shown in FIGS. 5, 6 and 7.
Figure 9:
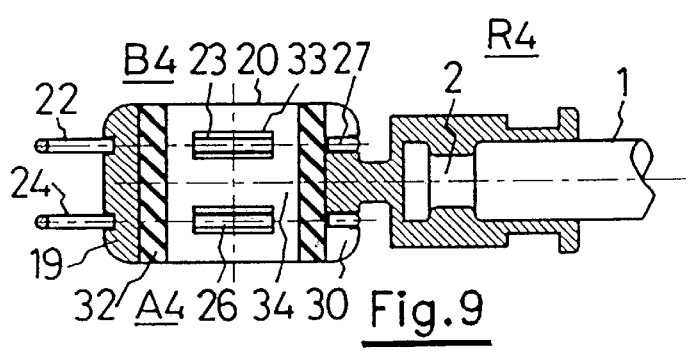
FIG. 9 is a longitudinal section view of a fourth mode of embodiment R4 of the ball and socket joint body of the invention.
Figure 10:
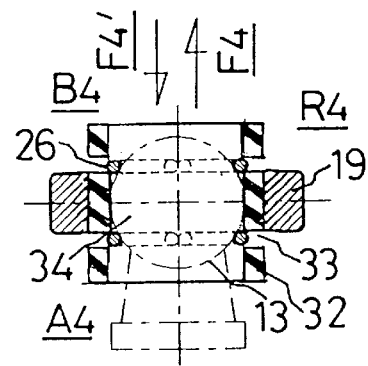
FIG. 10 is a cross-section view of the mode of embodiment R4 shown in FIG. 9.
Figure 11:
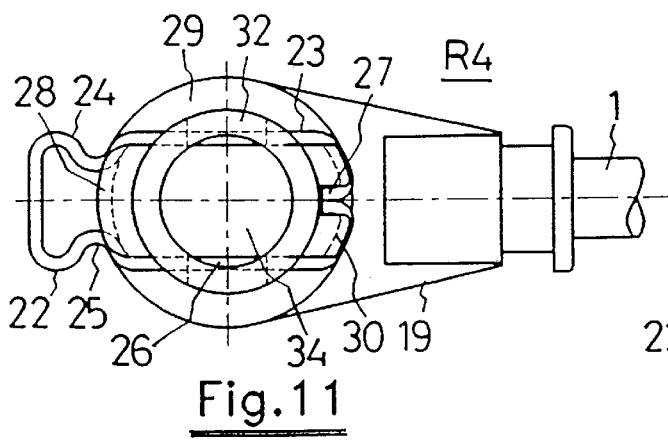
FIG. 11 is a plan view of the mode of embodiment R4 shown in FIGS. 9 and 10.
Figure 12:
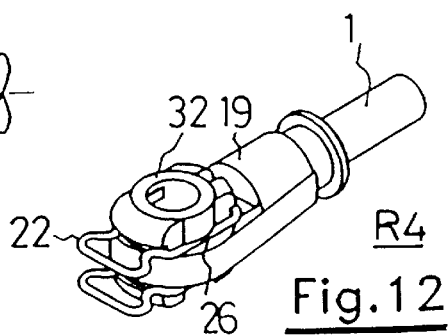
FIG. 12 is a perspective view of the mode of embodiment R4 shown in FIGS. 9, 10 and 11.

FIGS. 3 and 4 show how the mode of embodiment R2 comprises a ball and socket joint body 3 which, as in mode of embodiment R1, includes the coupling extension 2 of the rod 1. FIG. 3 shows how, transversally arranged with respect to the longitudinal axis of the rod 1, the ball and socket joint body 3 has a passage 18 which forms two equal inlet mouths A2 and B2, respectively. Coaxially arranged with respect to the transverse passage 18 there are two sleeves, a first sleeve 14 and second sleeve 15, respectively, superimposed on each other. The first sleeve 14 is of elastic material and acts as a shock absorber, while the second sleeve 15 is of elastic material of greater hardness than that of the first sleeve 14; both sleeves 14, 15 are of hollow general cylindrical shape open at both their ends, the second sleeve 15 forming at each end three coplanar sectoral projections 16 for retaining and seating regularly distributed and symmetrically arranged with respect to the main theoretical transverse plane of the transverse passage 18, with the coplanar sectoral projections 16 of both ends being situated in alternating positions. As described above for the mode of embodiment R1, both sleeves 14, 15 are secured to the ball and socket joint body 3 by means of the annular projection 8 and the detachable cover 9.

FIG. 3 shows how the second sleeve 15 forms a central chamber 17 which, delimited by the coplanar sectoral projections 16, is designed to receive the ball 13 with a close fit. In FIG. 3, the ball 13 is inserted into the central chamber 17 by traversing mouth A2; it can be understood that given the symmetry of the transverse passage 18, the ball 13 could be inserted into the central chamber 17 either through inlet mouth A2 or inlet mouth B2.

Each coplanar sectoral projection 16 has a cross section of sawtooth outline oriented inwards, as shown in FIG. 3. With this configuration of the projections 16, entry of the ball 13 into the central chamber 17, for example through mouth A2 as shown in FIG. 3, requires the application of a force F2 in the direction given by the longitudinal axis of the central chamber 12 of an intensity sufficient to overcome the elastic reaction of the corresponding coplanar sectoral projections 16, with the force F2 being lower in intensity than the contrary force F2' which has to be applied so that, once the ball 13 is situated in the chamber 17, it can then be withdrawn.

I claim:

1. A ball and socket joint for coupling an end of control cables with a terminal, comprising a ball member; and a ball and socket joint body including a metal rod having a longitudinal axis, a passage extending transversely to said longitudinal axis and having two opposite inlet mouths and a chamber for receiving said ball member; and elastically deformable retaining and seat means formed so that said ball can be introduced into and extracted freely from said chamber through one or other of said inlet mouths by double elastic deformation of said retaining and seat means, said elastically deformable retaining and seat means including two superposed sleeves which form a cylindrical seat and are coaxially arranged with respect to said transverse passage, a first one of said sleeves being formed as a shock absorber while a second one of said sleeves forming said chamber and having two opposite ends each provided with a plurality of coplanar sectorial retaining and seat projections so that positions of said projections at one of said ends alternates with positions of said projections at the other of said ends.

2. A ball and socket as defined in claim 1, wherein said second sleeve is provided with three retaining and seat projections.

3. A ball and socket as defined in claim 1, wherein each of said projections has a cross-section of interior-oriented saw tooth outline, so that entry of said ball into said chamber is implementable by application of a force producing elastic deformation of a corresponding one of said projections and being lower than an opposite force which has to be applied, once said ball is situated in said chamber, to produce elastic deformation of the other of said projections for withdrawal of said ball from said chamber.

* * * * *